United States Patent
Schumacher

(10) Patent No.: US 7,675,932 B2
(45) Date of Patent: Mar. 9, 2010

(54) ADAPTER FOR PROVIDING DIGITAL COMMUNICATION BETWEEN A FIELD DEVICE AND A COMPUTER

(75) Inventor: Mark S. Schumacher, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 643 days.

(21) Appl. No.: 11/595,466

(22) Filed: Nov. 9, 2006

(65) Prior Publication Data

US 2008/0114911 A1    May 15, 2008

(51) Int. Cl.
*G06F 13/12* (2006.01)
(52) U.S. Cl. .......................................... 370/463; 710/72
(58) Field of Classification Search ........................ None
See application file for complete search history.

(56) References Cited

U.S. PATENT DOCUMENTS

| | | | | |
|---|---|---|---|---|
| 6,016,523 | A * | 1/2000 | Zimmerman et al. | 710/63 |
| 6,211,649 | B1 | 4/2001 | Matsuda | |
| 6,377,859 | B1 | 4/2002 | Brown et al. | |
| 6,904,476 | B2 * | 6/2005 | Hedtke | 710/72 |
| 6,947,389 | B1 * | 9/2005 | Chen et al. | 370/252 |
| 7,421,531 | B2 | 9/2008 | Rotvold et al. | |
| 2002/0167904 | A1 | 11/2002 | Borgeson et al. | |
| 2004/0111238 | A1 | 6/2004 | Kantzes et al. | |
| 2004/0203296 | A1 * | 10/2004 | Moreton et al. | 439/894 |
| 2004/0228184 | A1 | 11/2004 | Mathiowetz | |
| 2004/0230327 | A1 | 11/2004 | Opheim et al. | |
| 2005/0114086 | A1 | 5/2005 | Zielinski et al. | |
| 2006/0282580 | A1 * | 12/2006 | Russell et al. | 710/62 |
| 2006/0291438 | A1 * | 12/2006 | Karschnia et al. | 370/338 |
| 2007/0016714 | A1 * | 1/2007 | Huotari et al. | 710/313 |
| 2007/0019560 | A1 * | 1/2007 | Brewer et al. | 370/252 |
| 2007/0121520 | A1 * | 5/2007 | Shrikhande et al. | 370/252 |
| 2008/0080550 | A1 * | 4/2008 | Malik | 370/465 |

FOREIGN PATENT DOCUMENTS

GB    2 394 124    4/2004

OTHER PUBLICATIONS

Official Search Report of the International PCT Application No. PCT/US2007/020675, filed Aug. 25, 2007.
"MacTek Corporation USB HART Interface Users' Manual" Available online, www.mactekcorp.com/pdfs/manual_31_EN_07MAY2003.pdf, Feb. 2003.

* cited by examiner

*Primary Examiner*—Min Jung
(74) *Attorney, Agent, or Firm*—Kinney & Lange, P.A.

(57) ABSTRACT

An adapter provides the components necessary to operate a computer or similar device as a communicator for smart field devices. The adapter includes terminals adapted for connection to the field device and a communication cable adapted for connection to the computer. Memory located within the adapter stores application software associated with the communication protocol employed by the field device. The application software stored by the memory is loaded onto the computer via the communication cable, allowing a user to receive and send data to the field device based on the communication protocol employed by the field device. The adapter includes a port circuit that interfaces bi-directionally communication between the computer and the field device using the communication protocol.

21 Claims, 2 Drawing Sheets

US 7,675,932 B2

ADAPTER FOR PROVIDING DIGITAL COMMUNICATION BETWEEN A FIELD DEVICE AND A COMPUTER

BACKGROUND OF THE INVENTION

The present invention relates generally to the process control and measurement field. More specifically, the present invention relates to a device and method for communicating with smart field devices used in process control and measurement systems.

Field devices are well-known tools used in the process control and measurement field. Field devices provide a user or control system with data regarding a particular process variable, such as pressure, flow or temperature. These devices are commonly employed in the petroleum, pharmaceutical, and chemical processing fields.

The use of "smart" field devices in process control and measurement systems allows for two-way communication between the field device and a communicator device (e.g., hand-held device or computer). Two-way communication is implemented using one of a plurality of communication protocols. However, a number of different protocols exist for smart field devices, each protocol requiring the communicator device to be configured in a different way. For instance, the highway addressable remote transducer (HART®) protocol allows a digital signal to be superimposed on the standard 4-20 milliamp (mA) analog signal. The HART® protocol employs a frequency shift keying (FSK) principle in which digital signals are represented by modulating the 4-20 mA signal±0.5 mA at either 1200 Hz (representing digital logic level "1") or 2200 Hz (representing digital logic level "0"). The superimposed digital signal allows the smart field device to both send and receive digital data, and is commonly used to transmit upon request diagnostic and multivariable information to a control room or handheld device. Other popular two-way digital communication protocols include the Fieldbus™ protocol and Profibus protocol.

Because each communication protocol operates differently, the communicator device must be configured based on the communication protocol employed by the field device. To prevent the situation in which users must carry around separate hardware for each known communication protocol, tools have been developed such as the handheld 375 Field Communicator from Emerson Process Management that supports communication with both HART® and Fieldbus™ devices. The 375 Field Communicator provides an intrinsically safe device for use in any process environment. However, not all applications require the robustness of the 375 Field Communicator. For instance, bench-top commissioning of a field device (i.e., prior to installation in the field) does not typically require an intrinsically safe communicator device. In these situations, customers often convert laptops or other computer devices to function as a communicator. While economically attractive, this method of communicating with a field device requires a customer to acquire and correctly connect a number of different elements, including a communication modem or interface, a power supply and a measurement resistor. Furthermore, the customer must also acquire and install application software onto the portable device specific to the communication protocol of the smart field device.

It would therefore be beneficial to provide a system that would simplify the process of connecting a computer or other portable device to a smart field device for the purposes of bi-directional communication.

BRIEF SUMMARY OF THE INVENTION

The present invention provides an adapter configured for connection between a field device and a computer that interfaces two-way digital communication between the field device and the computer. The adapter includes memory for storing the software applications required to communicate with a plurality of communication protocols. Depending on the communication protocol employed by the field device, the adapter auto-selects or a user selects from the computer the appropriate software application stored on the memory to load onto the computer. The adapter further includes hardware components necessary to communicate with a field device in a number of embodiments and configurations.

DETAILED DESCRIPTION

The present invention is an adapter that facilitates communication between a computer (e.g., a laptop, personal digital assistant, or personal computer) and a smart field device ("field device"). The adapter of the present invention provides a simple, integrated solution that allows a computer to communicate with a smart field device.

Figure 1:
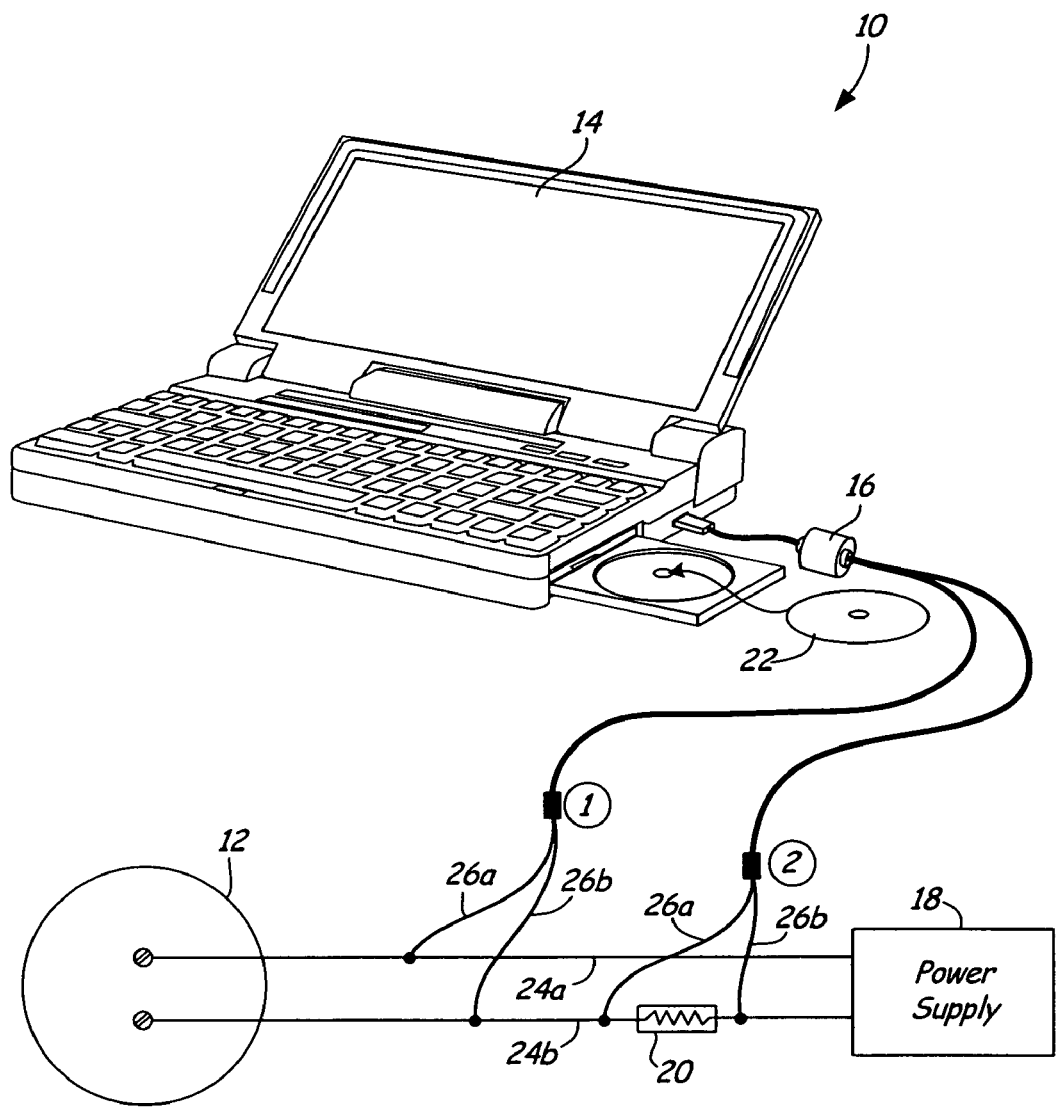
FIG. 1 is a block diagram representation of a system for communicating with a field device as known in the prior art.

FIG. 1 shows a block diagram representation of a typical communication system 10 for use in communicating with field device 12 as known in the prior art. System 10 includes computer device (e.g., laptop) 14, Universal Serial Bus (USB) interface device 16, power supply 18, load or measuring resistor 20, and software 22. Field device 12 employs the HART® communication protocol, although the same concepts could be applied to a field device using the Fieldbus™ communication protocol or Profibus communication protocol.

Wires 24a and 24b (forming what is known as "the current loop") connect field device 12 to power supply 18, such that power supply 18 provides a direct current (DC) current to the current loop. In HART® communications, field device 12 generates a digital signal by superimposing a ±0.5 mA current on the DC current provided by power supply 18 at a first frequency (representing a "1") or second frequency (representing a "0"). The digital signal is received by USB interface 16, which measures the resulting small signal or alternating current (AC) voltage on the current loop. The small signal voltage is measured either across field device 12 (leads 26a and 26b in the first position) or across measurement resistor 20 (leads 26a and 26b in the second position). USB interface 16 configures the measured digital signal and provides it to computer 14. Application software installed on computer 14 specific to the HART® communication protocol allows computer 14 to interpret the data received from field device 12. Furthermore, the user may provide instructions to field device 12 via the USB port and USB interface 16, which convert the instructions to the HART® communication protocol for delivery to field device 12.

The drawback of the prior art system shown in FIG. 1 is the number of individual components a user must acquire and correctly connect in order to communicate with field device 12, including computer 14, USB interface device 16, power supply 18, measuring resistor 20, and software 22. Improper installation or connection of any component will prevent a user from communicating with field device 12.

Figure 2:
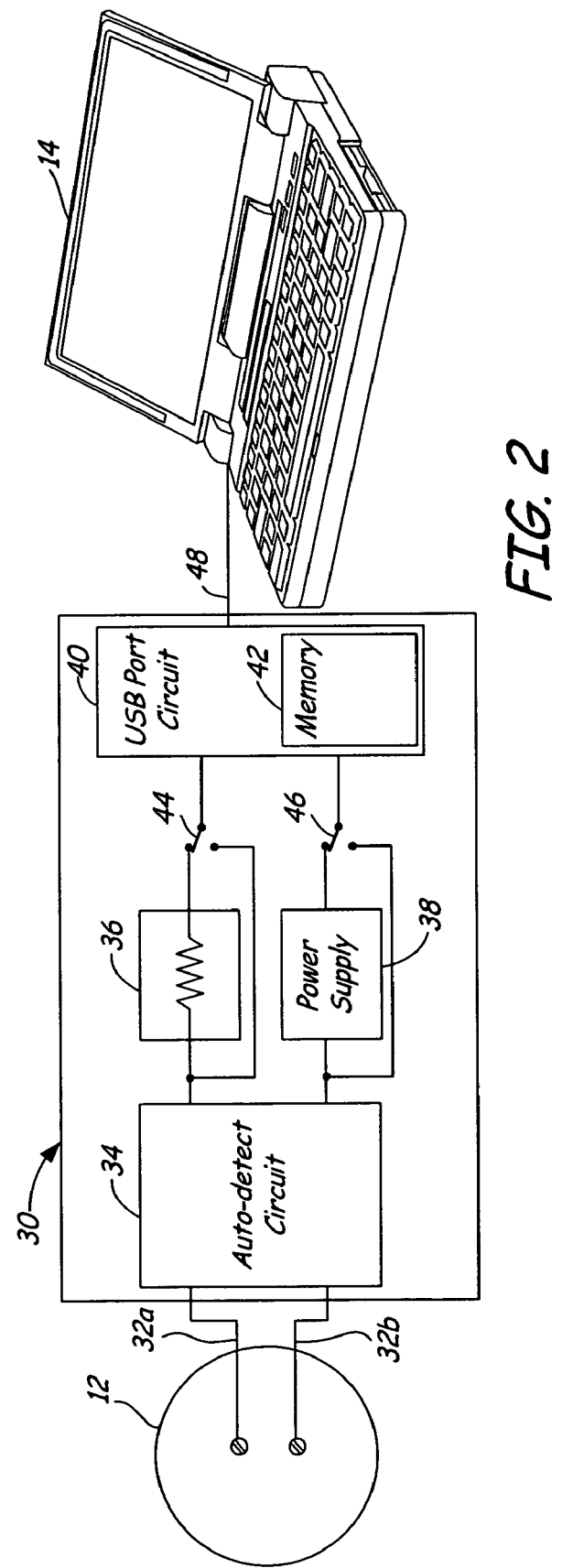
FIG. 2 is a block diagram representation of an adapter that interfaces between a smart field device and a computer to provide bi-directional communication.

FIG. 2 shows a block diagram of USB adapter 30 of the present invention, which reduces the complexity of the prior art and provides a simple interface with field devices regardless of the communication protocol being used. Adapter 30 includes leads 32a and 32b adapted for connection to the terminals of field device 12, auto-detect circuit 33, measurement or load resistor 36, current loop power supply 38, USB port circuit 40, memory 42, switches 44 and 46, and USB cable 48. USB adapter 30 is connected to computer 14 using USB cable 48, and is connected to field device 12 using leads 32a and 32b.

USB adapter 30 can be used for bench top testing and commissioning of field device 12, or for testing and communication with field device 12 when installed in a process control and measurement environment (i.e., in "the field"). USB adapter 30 provides compatibility with a variety of communication protocols by storing the application software necessary to operate computer 14 as a communicator, regardless of the communication protocol employed by field device 12. In this embodiment, memory 42 stores the application software associated with each of the plurality of communication protocols.

Connecting USB adapter 30 to field device 12 allows auto-detect circuit 34 to determine the communication protocol being employed by field device 12. Each communication protocol includes characteristics that allow for identification. For instance, Fieldbus™ communicates using a square-wave signal, whereas the HART® protocol communicates using a sine wave. Auto-detect circuit 34 communicates the detected communication protocol to USB port circuit 40. Based on the detected communication protocol, USB port circuit 40 uploads from memory 42 to computer 14 the appropriate application software. For instance, if auto-detect circuit 34 detects field device 12 is employing the HART® communication protocol, then USB port circuit 40 uploads to computer 14 the application software necessary to allow computer 14 to communicate based on the HART® communication protocol. In one embodiment, the upload of the appropriate application software to computer 14 is done automatically. In another embodiment, USB port circuit 40 communicates the detected communication protocol to computer 14. A user then selects the appropriate software from memory 42 to be uploaded onto computer 14. Storing the application software associated with a number of communication protocols in USB adapter 30 (specifically, memory 42) obviates the need for a user to acquire and install software from a CD or other storage medium based on the communication protocol of a particular field device.

Installing the appropriate application software on computer 14 allows computer 14 to communicate with field device 12. Although computer 14 communicates with USB adapter 30 using the USB communication standard, the instructions provided to USB adapter 30 are based on the communication protocol employed by field device 12. That is, if field device 12 employs the HART® communication protocol, then instructions or data provided by computer 14 to USB adapter 30 are communicated using the USB standard, but are specific to the HART® communication protocol employed by field device 12. If field device 12 employs the Fieldbus™ communication protocol, then instructions or data provided by computer 14 to USB adapter 30 are communicated using the USB standard, but are specific to the Fieldbus™® communication protocol employed by field device 12.

During bench top commissioning (i.e., field device 12 not connected to a measuring system) leads 32a and 32b are connected to terminals on field device 12. Typically, during bench top commissioning, no external power is supplied to field device 12. As shown in FIG. 1, the prior art system requires a user to acquire and properly connect an appropriate power supply to field device 12. USB adapter 30 of the present invention includes built-in power supply 38. For bench-top commissioning (or any situation in which no external power is provided to field device 12), switch 46 is positioned to connect power supply 38 to field device 12 through leads 32a and 32b. Power supply 38 derives the power provided to field device 12 from computer 14 through USB connection 48, thereby obviating the need for a user to provide an independent power supply as required in the prior art system shown in FIG. 1. The DC power provided by power supply 38 is sufficient to enable field device 12 to transmit and receive digital communications. For instance, if field device 12 employs the HART® protocol, field device 12 modulates the DC current provided by power supply 38, superimposing an AC current signal at either a first frequency or second frequency to provide digital communication. During field-testing in which field device 12 is already connected to a power supply, switch 46 is placed in the opposite position, removing power supply 38 from supplying unnecessary power to field device 12.

Likewise, measurement resistor 36 can be selectively connected to the current loop created by leads 32a and 32b by positioning switch 44. All communication protocols require the current loop to have a minimum resistance value. As discussed above, during bench-top commissioning field device 12 is not connected to a measurement system having the required amount of resistance. In this situation (as well as other similar scenarios), measurement resistor 36 is included in the current loop by placing switch 44 in the top position. If field device 12 is connected to a process and measurement system wherein the current loop includes the necessary resistance, then measurement resistor 36 is not required and can be excluded by placing switch 44 in the bottom position.

Following proper connection of USB adapter 30, and loading and executing of software onto computer 14, USB adapter interfaces bi-directional communication between computer 14 and field device 12. Instructions provided by computer 14 (using the installed application software) are provided to USB port circuit 40 of USB adapter 30. The instructions or data provided by computer 14 are encoded based on the communication protocol employed by field device 12. If field device 12 employs the HART protocol, then the instructions provided by computer 14 to USB port circuit will be based on the HART protocol. Likewise, if field device 12 employs the Fieldbus™ protocol or Profibus protocol, then the instructions provided by computer 14 to USB port circuit 40 will be based on the Fieldbus™ or Profibus protocols, respectively. USB port circuit 40 then communicates the received instructions to field device 12 using the appropriate communication protocol (e.g., for HART communications, USB port circuit 40 modulates the current on the current loop ±0.5 mA at either 1200 Hz or 2200 Hz to communicate the received instructions to field device 12). If field device 12 employs a different communication protocol, then USB port circuit 40 would communicate the received instructions using the appropriate protocol (such as Foundation Fieldbus or Profibus). Likewise, digital information provided by field device 12 to the current loop is read by USB port circuit 40 and provided to portable device 14 via USB cable 48. The information is displayed on a user interface (i.e., display or screen) by the application software for the benefit of the user.

Although the present invention has been described with reference to preferred embodiments, workers skilled in the art will recognize that changes may be made in form and detail without departing from the spirit and scope of the invention. In particular, the present invention has been described with respect to a USB adapter that makes use of the Universal Serial Bus standard for communication between the adapter and the computer, although other types of communication could be employed such as Firewire or others. If a different communication standard were employed, the port circuit and cable would be modified as appropriate. While connection to a USB or Firewire port (or other) is commonly done via cable, any type of mating terminal that allows the computer to communicate with the adapter is acceptable. Similarly, the type of memory employed within USB adapter 30 may be implemented with any type of non-volatile memory (e.g., Flash memory).

Computer 14 is a generic term for any device capable of executing the application software and providing a user interface for a user, such as a laptop, personal digital assistant (PDA), or personal computer (PC).

The invention claimed is:

1. An adapter for interfacing communications between a computer and a field device, the adapter comprising:
   terminals adapted for connection to the field device;
   a communication mating device adapted for connection to a communication port on the computer;
   a memory module for storing application software with respect to a plurality of communication protocols, wherein application software specific to a communication protocol employed by the field device is uploaded onto the computer via the communication mating device, the application software allowing the computer to send and receive data based on the communication protocol employed by the field device; and
   a port circuit connected to the field device by the terminals and to the computer by the communication mating device, wherein the port circuit interfaces bi-directional communication between the field device and the computer based on the communication protocol employed by the field device.

2. The adapter of claim 1, wherein the adapter provides communication between the port circuit and the computer over the communication mating device using a Universal Serial Bus (USB) protocol.

3. The adapter of claim 1, wherein the field device communicates with the port circuit using a Highway Addressable Remote Transducer (HART) protocol and the computer is configured with application software specific to the HART protocol.

4. The adapter of claim 1, wherein the field device communicates with the port circuit using a Fieldbus protocol and the computer is configured with application software specific to the Fieldbus protocol.

5. The adapter of claim 1, wherein the field device communicates with the port circuit using a Profibus protocol and the computer is configured with application software specific to the Profibus protocol.

6. The adapter of claim 1, further including:
   a power supply switchably connected between the port circuit and the terminals, wherein the power supply is connected between the port circuit and the terminals to provide power to the field device when no other external power is provided to the field device.

7. The adapter of claim 6, wherein the power supply receives the power provided to the field device from the computer via the communication mating device.

8. The adapter of claim 1, further including:
   a resistor switchably connected between the port circuitry and the terminals, wherein the resistor is connected as required to provide a resistance necessary to allow communication based on the communication protocol employed by the field device.

9. The adapter of claim 1, further including:
   an auto-detect circuit connected to detect the communication protocol employed by the field device, wherein the detected communication protocol is communicated to the port circuit.

10. The adapter of claim 9, wherein the port circuit causes the application software specific to the communication protocol detected by the auto-detect circuit to be uploaded to the computer from the memory module.

11. A method of providing bi-directional communication between a computer and field device using an adapter, the method comprising:
    connecting the adapter to the computer using a communication mating device;
    connecting the adapter to the field device using a pair of terminals;
    detecting a communication protocol being employed by the field device;
    transferring application software from memory located within the adapter to the computer, wherein the application software uploaded to the computer is associated with the detected communication protocol employed by the field device and allows the computer to send and receive data based on the communication protocol employed by the field device; and
    communicating data bi-directionally between the field device and the computer based on the communication protocol employed by the field device.

12. The method of claim 11, wherein communicating data bi-directionally between the field device and the computer includes:
    receiving an instruction from the computer via the communication mating device, wherein the instruction is formatted based on the communication protocol of the field device;
    transmitting the instruction received from the computer to the field device via the pair of terminals, wherein the instruction is transmitted using the communication protocol of the field device;
    receiving data from the field device via the pair of terminals wherein the data is received from the field device using the communication protocol of the field device; and
    transmitting the data received from the field device to the computer via the communication mating device.

13. The method of claim 12, wherein the communication mating device connecting the adapter to the computer employs the universal serial bus (USB) communication standard.

14. The method of claim 11, further including:
    selectively connecting a power supply located within the adapter to the field device based on whether the field device is receiving the required power from an external power supply.

15. The method of claim 14, wherein the power supply receives the power provided to the field device from the computer through the communication mating device.

16. The method of claim 11, further including:
selectively connecting a resistor located within the adapter to the field device based on whether a required amount of impedance is present between the field device and the adapter.

17. The method of claim 11, wherein transferring application software from memory located within the adapter to the computer includes:
automatically transferring application software from the memory located within the adapter to the computer based on the detected communication protocol employed by the field device.

18. An adapter that interfaces communication between a computer and a field device, the adapter including:
means for connecting the adapter to the computer;
means for connecting the adapter to the field device;
memory means for storing application software associated with a plurality of field device communication protocols, wherein the application software associated with a communication protocol employed by the field device is loaded onto the computer using the means for connecting the adapter to the computer; and
means for communicating data bi-directionally between the field device and the computer based on the communication protocol employed by the field device.

19. The adapter of claim 18, further including:
a power supply switchably connected to provide power to the field device when no other external power is provided to the field device.

20. The adapter of claim 19, wherein the power supply receives the power provided to the field device from the computer via the means for connecting the adapter to the computer.

21. The adapter of claim 18, further including:
a resistor switchably connected to the field device, wherein the resistor is connected as required to provide the resistance necessary to allow communication based on the communication protocol employed by the field device.

* * * * *